Nov. 3, 1942.  B. KELLEY  2,300,789
FILTERING APPARATUS
Filed July 6, 1939  3 Sheets-Sheet 1

Inventor:
BLAINE KELLEY
By Paul B. Eaton
Attorney

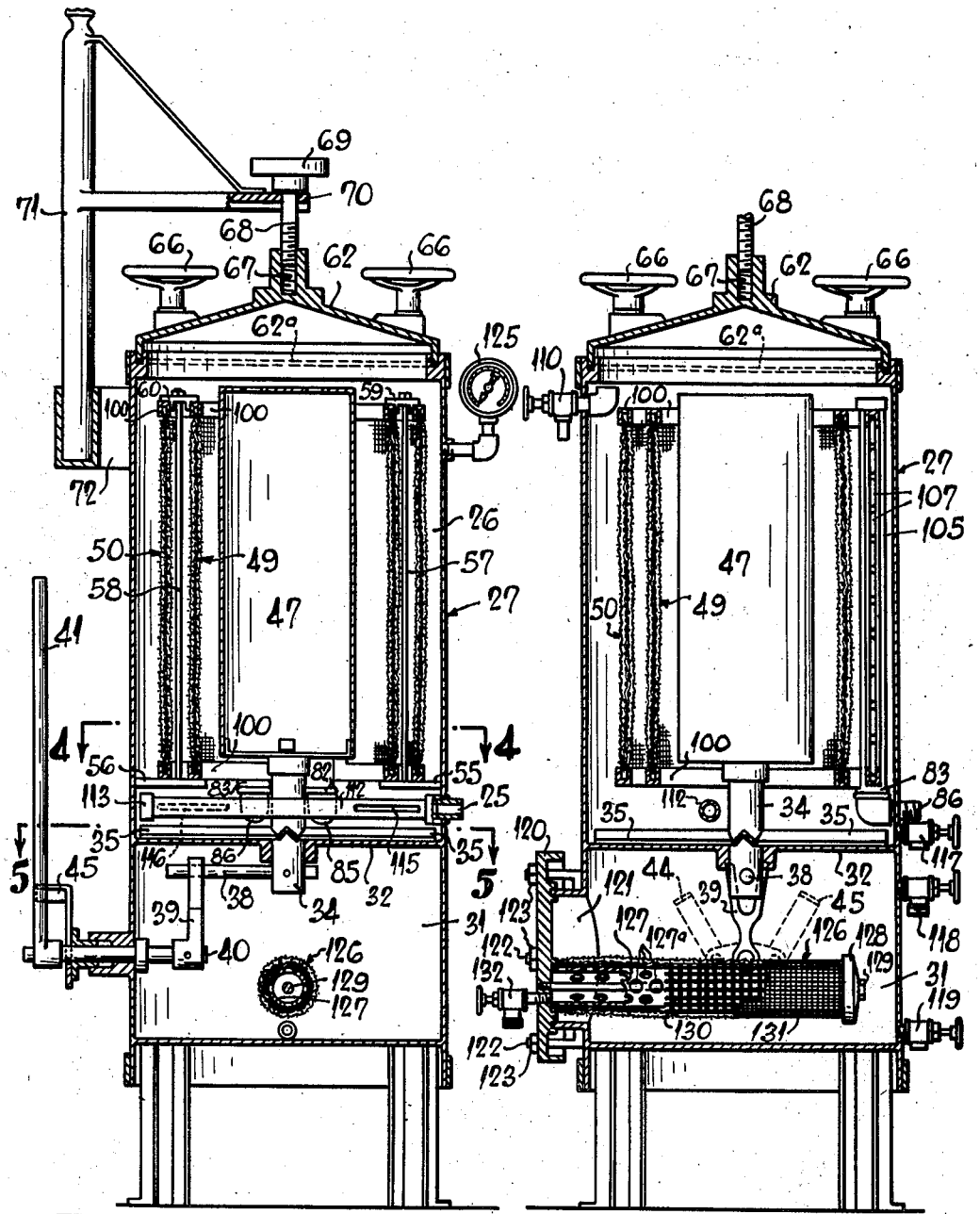

Nov. 3, 1942.  B. KELLEY  2,300,789
FILTERING APPARATUS
Filed July 6, 1939  3 Sheets-Sheet 3
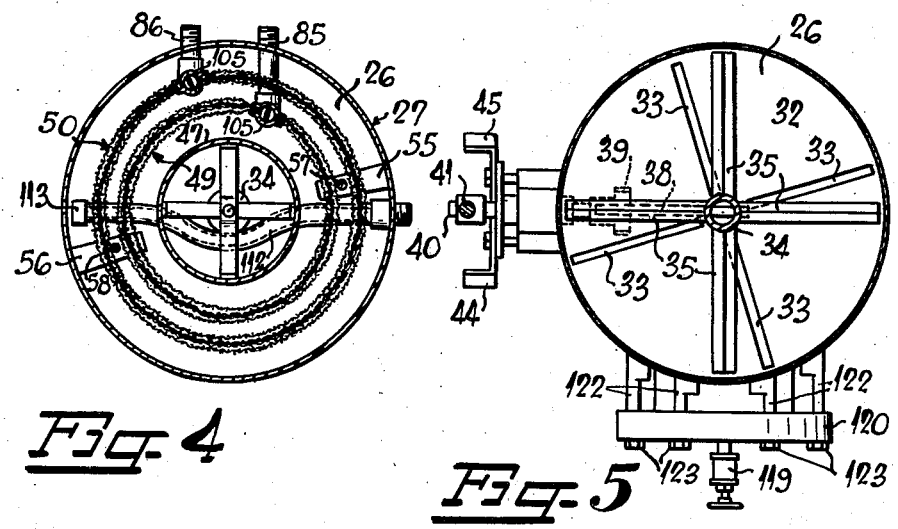
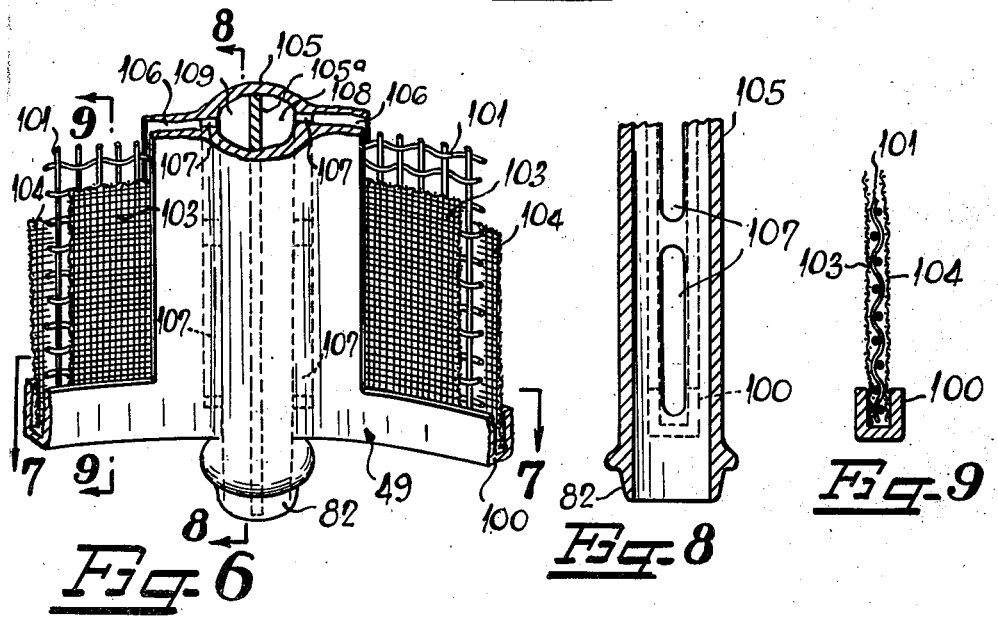
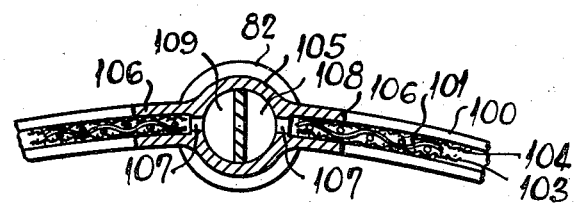
Inventor:
BLAINE KELLEY
Attorney Patented Nov. 3, 1942

2,300,789

UNITED STATES PATENT OFFICE 2,300,789

FILTERING APPARATUS

Blaine Kelley, Charlotte, N. C.

Application July 6, 1939, Serial No. 283,009

21 Claims. (Cl. 210—182)

This invention relates to a cleansing apparatus for garments and the like and more especially to an apparatus of this type having means associated therewith for continuously purifying the cleansing fluid.

It is an object of this invention to provide the combination of a cleansing vat in which garments are cleaned and a fluid purification tank with a filtering device therein and means for circulating the fluid from the vats through the filter and again back into the vat while the vat is in operation.

It is another object of this invention to provide a circulating system of the class described having means for reversing the flow of the cleansing fluid through the filtering means when it is desired to cleanse the filter.

It is a still further object of this invention to provide a purification tank for dry cleaning apparatus having upper and lower compartments with a partition therebetween, the upper compartment having a plurality of concentric filter grids therein and the lower compartment being adapted to receive the substance retained by the filters. The partition between the compartment has a plurality of slots therein through which the retained sediment is forced into the lower compartment by a scraping device resting on the top side of the partition and normally closing the slots.

Some of the objects of the invention having been stated, other objects will appear as the description proceeds when taken in connection with the accompanying drawings, in which—

Figure 2 is a vertical sectional view through the purification tank shown in the left hand portion of Figure 1;

Figure 3 is a vertical sectional view through the purification tank taken along the line 3—3 in Figure 1;

Figure 4 is a sectional plan view taken along the line 4—4 in Figures 1 and 2;

Figure 5 is a sectional plan view taken along the line 5—5 in Figures 1 and 2;

Figure 6 is an isometric view showing the structure of the concentric filter grids which are disposed on the interior of the filtering tank;

Figure 7 is a sectional plan view taken along the line 7—7 in Figure 6;

Figure 8 is a vertical sectional view taken along the line 8—8 in Figure 6;

Figure 9 is a vertical sectional view taken along the line 9—9 in Figure 6.

Figure 1:
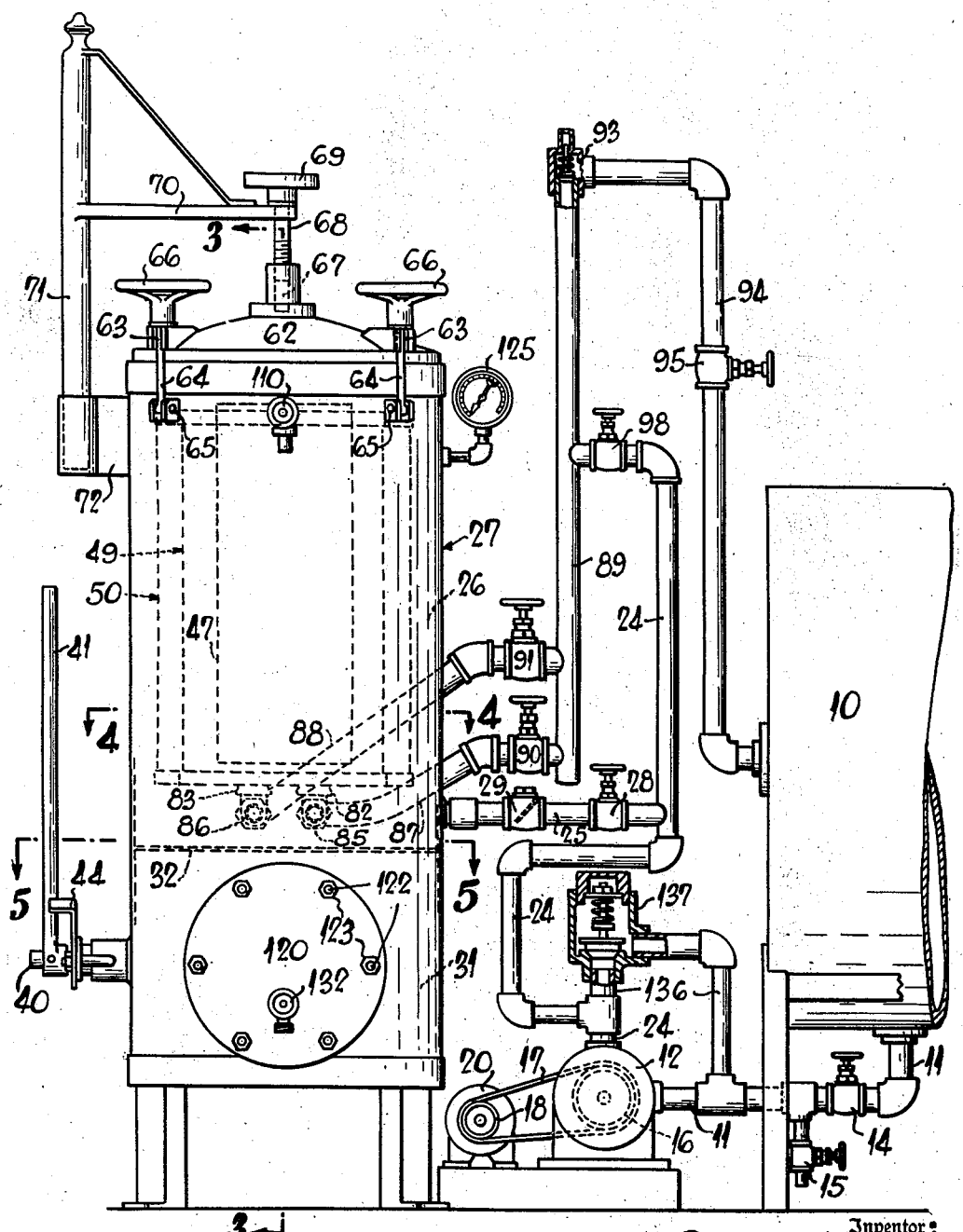
Figure 1 is an elevation showing the combination of a washing vat, purification tanks, pump, and interconnecting pipes therebetween.

Referring more specifically to the drawings, the numeral 10 denotes a conventional vat or washing machine into which clothing or other garments are placed for cleaning purposes. Leading from the lower side of this vat is a pipe 11 which extends to the intake side of pump 12. Valve 14 and drain 15 are disposed intermediate the ends of the pipe 11. The pump 12 has a pulley 16 upon which a belt 17 is mounted and this belt is also mounted upon a motor pulley 18 of motor 20. The outlet side of the pump 12 has a pipe 24 leading therefrom and from the pipe 24 another pipe 25 leads into the lower portion of compartment 26 of purification tank 27. Pipe 25 has a suitable hand valve 28 disposed therein and also a check valve 29 to prevent the solution from flowing backwardly in the pipe, that is, flowing from the tank toward the pump.

The lower portion of the tank 27 has a sediment compartment 31, said compartment 31 being separated from the compartment 26 thereabove by means of a suitable bottom or partition 32. By observing Figure 5, it will be noted that the bottom 32 has a plurality of radially disposed slots 33 therein through which the sediment which accumulates upon the bottom is allowed to pass.

The bottom 32 has rotatably mounted therein a vertically disposed pipe 34 which has extending radially therefrom a plurality of scraping and closure members 35. These scraping members rest upon the top of the partition 32 and normally close the slots 33 but are adapted to scrape the surface between the radial slots 33 when the pipe 34 is rotated. It is seen that as these arms are rotated that the sediment which has accumulated upon the bottom will be forced into the openings 33 from which it will settle into the sediment compartment 31 therebelow.

The lower end of the pipe 34 has a horizontally extending shaft 38 secured therein, the free end of which is adapted to loosely fit in the upper end of forked member 39, said forked member having its lower end fixedly secured upon the inside end of a horizontally disposed shaft 40. The shaft 40 is rotatably mounted in the sidewall of the tank 27 and has its other end projecting on the exterior thereof. On the projecting end of the shaft 40 a suitable hand lever 41 is fixedly secured for the operation of the shaft when it is desired to oscillate the scraping members 35 back and forth. Stop members 43 and 44 are provided to limit the stroke of the lever 41.

The upper end of the pipe 34 has a cylindrical drum 47 mounted thereon. This drum is mounted in the central portion of the tank 27 and serves to assist in proper circulation of the cleansing fluid in the upper compartment. In other words, this cylinder is a simple obstruction which prevents the definite upwardly whirling flow from becoming a wild, turbulent flow. Where the whirling flow is too great, a vortex is formed in the center of the tank, thus drawing the solid substance to this point. The means for creating this whirling flow will be later described.

Concentrically disposed around the cylindrical member 47 are filter grids 49 and 50. The lower ends of these grids are supported by laterally and inwardly projecting members 55 and 56 extending from the interior sidewalls of the upper compartment. Extending upwardly from the laterally projecting members 55 and 56 are rods 57 and 58, said rods being disposed between the two concentric grids and having lugs 59 and 60 respectively on the upper ends thereof which lugs are held against the upper portion of the grids 49 and 50 to secure the same in fixed position within the compartment.

The upper end of the tank 27 is normally closed by a cap 62. This cap has a plurality of radial slots 63 disposed therein in which vertically disposed rods 64 are adapted to fit. The lower ends of the rods 64 are pivoted as at 65 to the exterior of the upper portion of the tank and the upper end of each rod has threadably secured thereon a hand wheel 66 which is manipulated to clamp the cap firmly over the upper end of the tank. The central portion of the cap 62 has a threaded bore 67 therein. A rod 68 is threadably secured in this bore, the upper end of this rod having a hand wheel 69 fixedly secured thereon. The portion of rod 68 directly below the hand wheel, is rotatably mounted in a horizontal cantilevered member 70 and this member is supported by a vertically disposed post 71, the lower end of which is rotatably mounted in bearing 72 extending laterally from the periphery of tank 27. When it is desired to remove the cover 62, it is necessary to first loosen the hand wheels 66 and then rotate the hand wheels and their associated rods 64 about the pivot points 65 until they become disengaged from the slots 63 in the cap. Then the hand wheel 69 is turned to cause the cap 62 to be raised from the top of the tank, after which the supporting post 71 is rotated so that the lid or cover will be removed from above the tank.

The screens 49 and 50 have outlets 82 and 83 leading therefrom (see Figures 2, 3 and 6), which are adapted to seat upon the upper ends of pipes 85 and 86, respectively, said pipes extending through the sidewall of the tank. The pipes 85 and 86 have connected to the exterior ends thereof pipes 87 and 88 and these pipes have their other ends connected to a vertically disposed pipe 89. The pipes 87 and 88 also have hand valves 90 and 91, respectively therein which are used when it is desired to direct the solution through one screen only or to control the amount of fluid passing through the screens. The upper end of the pipe 89 has a check valve 93 therein and connected to the other side of the check valve is another pipe 94 with a valve 95 therein which leads back into the washing vat 10.

It will be noted (Figure 1) that the pipe 24 has a hand valve 98 therein which is normally closed when the circulating system is in operation and the washing vat is washing or cleaning garments and the like. At this time the solution in the vat 10 will flow downwardly through pipe 11 into pump 12 from whence it will flow through pipes 24 and 25 and then into the lower portion of the upper compartment 26. The solution will then flow from the exterior of the screens of filter grids 49 and 50 to the interior thereof from whence it will flow out of said screens through openings 82 and 83 and into pipes 85 and 86. From pipes 85 and 86 the fluid will flow through pipes 87 and 88 into pipe 89 and pipe 94, and back into the vat 10. Of course it will be necessary when the fluid is flowing in this direction for the valves 14, 28, 90, 91 and 95 to be opened, and for the valves 15 to 98 to be closed.

Figures 6 to 9 inclusive show an enlarged detail view of a portion of the filter grid 49. It is here noted that the filter grid 49 has upper and lower rims 100 which are U-shaped in cross section. Within this U-shaped rim the upper and lower edges of a coarse mesh screen 101 is adapted to fit. This coarse screen is interposed between two fine mesh screens 103 and 104, the fine mesh screen 103 being disposed on the interior and the screen 104 being disposed on the exterior of the coarse mesh screen. Extending from the top to the bottom of the filter is a pipe 105, said pipe being an upward extension of the outlet 82 therebelow. This pipe has vertical U-shaped trenches 106 extending from opposed sides thereon in which the edges of the screen members 101 and 103 and 104 are adapted to fit. Suitable slots 107 are cut in the pipe 105 at such a position that they will provide a communication between the interior of the pipe and the U-shaped trenches 106. Since in normal operation the cleansing fluid is forced from the exterior to the interior of the filter grids, the fluid will find an outlet by way of the slots 107 to the interior of the pipe 105 from whence it will escape to the exterior by way of outlet 82 and pipes 85 and pipe 87. Any foreign matter which happens to be in the cleansing fluid will be retained by the fine mesh screens 103 and 104, thereby allowing the purified fluid to pass again into the tank or vat 10. The filter grid 50 is identical in construction except that it is larger in diameter, hence like reference characters will be applied to corresponding parts and another description will not be made. The pipe 105 has a division 105a forming semicircular passageways 108 and 109 on each side thereof, which extends the entire length of the pipe. Whenever foreign matter accumulates within the interior of the grid construction it is necessary to remove the grid from the tank and then direct a fluid under pressure into one side of the pipe as at 108 from whence it will pass outwardly through slots 107 and between the fine mesh cylindrical screens 103 and 104 and back into passageway 109. This gives a washing action to the interior of the grid and is possible only because the grid is cylindrical in shape.

After the machine has been in operation for some time, the screens 103 and 104 become coated with foreign substances and therefore, it is necessary to remove this foreign matter. In order to effectively do so, it has been found practical to reverse the direction of flow of the liquid in the filter grids so that it will flow from the interior to the exterior and thereby remove the foreign matter from the outside of the fine mesh screen. This operation is effected by closing the valves 28 and 95 and opening the valves 14, 90, 91 and 98 after which the liquid will flow from the vat 10 through pipe 11, pump 12, pipe 24, pipes 89, 87 and 88 to the interior of the filter grids 49 and 50 and into the upper compartment 26. Only a small amount of reverse flow is necessary or can be effected because the upper compartment 26 will soon become filled; however, when the pressure becomes excessive within the upper compartment, suitable release valve 110 can be opened to allow air as well as excess liquid to escape. The substance which is removed by this reverse flow settles on top of partition 32, after which the scrapers 35 are oscillated to cause the same to move downwardly into the lower compartment 31 through the slots 33.

The release valve 110 is positioned in the sidewall of the tank 27 instead of in the cap 62 as heretofore has been the case. By so positioning the valve, the solvent or cleansing fluid is not allowed to rise to the junction point of the tank and the cap. Since a gasket 62a made of rubber or other material, is usually positioned between the cap and the tank to perfect the seal, it is desirable to prevent any solution from contacting it that might damage it. Many solutions used in apparatus of this type are injurious to rubber compounds. If it is desired to backwash only one of the filter grids, the valves 90 or 91 may be closed, depending upon which grid is to be backwashed. For example, when only filter grid 49 is to be backwashed, the valve 90 is opened and the valve 91 is closed; whereas if only filter grid 50 is to be backwashed, the valve 90 is closed and the valve 91 is opened.

By referring to Figures 2 and 4, it will be seen that where the pipe 25 enters the lower compartment 27 that another pipe 112 is provided. This pipe extends diametrically across the lower portion of the compartment 26 at a slight distance above the bottom 32. The extreme left hand end of this pipe has a cap 113 secured thereon and cut in the opposed sides of the pipe 112 are slots 115 and 116. The slot 115 is cut only in the near side of the pipe as shown in Figure 2 and the slot 116 is cut only in the far side of the pipe. These slots provide an outlet through which the fluid leaves the pipe. Due to the position of the slots, a clockwise whirling motion of the fluid will be produced in the lower portion of the tank.

A suitable drain valve 117 is provided in the lower portion of the compartment 27. Drain valve 117 is important because it allows clean liquid to be withdrawn from the filter whenever it is necessary to drain the filter down for the purpose of opening the sludge door 120. After the grids have been either scraped down or backwashed, handle 41 is rotated and the spent filter cake is disposed of in the sludge chamber. The valve 117 can be opened and the relatively clear fluid can be withdrawn from the active filter compartment and temporarily stored in a tank or even in the washing machine; and the fluid is usually in good condition for recirculating through the filter after the filter has been refilled following removal of sludge. Other filters do not have a partition 32 separating the active filter compartment 26 from the sludge chamber 32 and the withdrawal of fluid from the filter is quite a serious problem because the muck rises up whenever the fluid is withdrawn with any rapidity at all, with the result that the withdrawn fluid is relatively dirty and must be settled or treated before it is in condition to be used again. Likewise drain valves 118 and 119 are provided in the lower compartment 31. In order to provide a suitable means for access to the lower compartment, a clean-out door 120 has been disposed over an opening or manhole 121 which leads from the lower compartment to the exterior. The cover is secured over this opening by means of suitable bolts 122 and nuts 123. If desired, a suitable pressure gauge 125 may be provided for indicating the amount of pressure present in the casing 27.

In the sludge compartment 31 a cartridge filter arrangement has been devised for allowing the liquid to be discharged therethrough, leaving the muck within the compartment in a practically dry condition. This filtering arrangement is broadly designated by reference characters 126 and comprises a pipe 127 having perforations 127a therein. A cap 128 is fastened over one end of the pipe by means of a bolt 129, said bolt penetrating the central portion of the pipe and having its other end threadably secured to the interior of clean out door 120. It is, therefore, seen that the bolt 129 also secured the pipe 126 to the clean-out door. The pipe 126 is surrounded by a coarse mesh screen 130 which in turn is covered by a fine mesh Monel screen 131. A valve 132 is opened to allow the filtered liquid to escape. When it is desired to discharge the liquid from the muck in compartment 31 the cleaning vat and the pump are out of operation, but all valves leading to the tank 27 are closed with the exception of valves 118 and 132. Then compressed air is forced into the compartment 31 through valve 118. This air will force the liquid from the muck through the filter cartridge and out through valve 132, leaving the muck in a practically dry or molten state. If the pump should be started with all of the discharge valves closed an excessive pressure would ordinarily be built up within the pump, tank and piping system. An excessive pressure would probably damage the filter grids as well as other parts of the system. In order to prevent this excessive pressure, a by-pass pipe 136 has been installed between the inlet pipe 11 and discharge pipe 24, said by-pass pipe having a spring loaded discharge relief valve 137 therein, which will allow any excess pressure on the discharge side of the pump to pass back to the intake side.

In actual filtering, the filter is first prepared for use by agitating a porous filter powder in the vat or washer for a period of approximately 10 minutes to cause proper suspension of the filter powder in the fluid. The fluid is then circulated through the filter proper and the powder deposits itself on the screen surfaces to form the porous coating.

Following this, loads of garments are placed in the vat or washer and a porous filter powder is also added. It is also common practice to add a fuller's earth or a chemical powder with the garments and agitate the load for at least 10 minutes after which circulation is turned on and the filter powder acts as a carrier of the fuller's earth or chemical powder and the whole is added to the precoat originally deposited upon the grids.

In the dry cleaning process, the most commonly used fluid has a petroleum base or it can be one of the synthetic solvents such as carbon tetrachloride or the like. However, the filter should not be understood as being restricted to the dry cleaning process alone.

Especial attention is called to the back washing feature wherein the vertically disposed passageways 108 and 109 are provided as an integral part of the sidewalls of the filter grids and having openings 107 communicating with the space between the filter screens. Due to the size of these openings when back washing takes place, instead of the liquid all passing out around the bottom of the filter, it is approximately equally distributed throughout the height of the filter grid and therefore all portions of the filter grid are back washed, that is the deposited filter cake is disposed off the exterior surface of the screens.

Attention is also called to the feature of the cartridge filter 126 disposed in the sludge compartment. It is attached to the door 120 so that it can be easily removed with the door 120 for the purpose of being cleaned. When compressed air is forced into the casing 27, the filter cake is deposited deeply and tightly into the meshes of the screen 126 of the cartridge filter and by having the cartridge filter easily removable from the sludge chamber, the cleaning of the same is facilitated.

In the drawings and specification there has been set forth a preferred embodiment of the invention, and although specific terms are employed they are used in a generic and descriptive sense only, and not for purposes of limitation, the scope of the invention being set forth in the appended claims.

I claim:

1. In a pressure filter of the class described, a container, a horizontally disposed partition dividing the container into upper and lower compartments, a plurality of concentrically disposed circular filter members disposed within the upper compartment, an input pipe disposed below the filters and having oppositely directed slots in its sides and being disposed on opposed sides of the center of the container for imparting swirling motion to the incoming fluid, a plurality of output conduits leading to the exterior or the container, and having seats disposed within the upper compartment, each filter having inner and outer filtering surfaces and a member having a channel communicating with the interior portion of the filter and having seats adapted to seat in the seats on the ends of the output conduits, a cylindrical baffle member disposed in the center of the upper compartment for directing the fluid against the filters, the horizontally disposed partition having a slot therein, a scraper member normally closing said slot, means extending to the exterior of the casing for imparting rotary motion to said scraper to establish communication between the upper and lower compartments and to scrape the deposited filter cake from the upper surface of the partition and deposit the same in the lower compartment through said slot.

2. In a pressure filter of the class described for filtering fluids and employing a filter cake or powder, a container, a horizontally disposed partition dividing the container into upper and lower compartments, a plurality of concentrically disposed filter members disposed within the upper compartment, an input pipe disposed below the filters and having oppositely directed slots therein on opposed sides of the center of the container for imparting a swirling motion to the incoming fluid, a plurality of output pipes leading to the exterior of the container and having seats disposed within the upper compartment, the filters having inner and outer filtering surfaces, a connection communicating with the interior portion of the filter and having seats adapted to seat in the seats on the ends of the output pipes, a baffle member disposed in the center of the upper compartment for directing the fluid against the filters, the horizontally disposed partition having a slot therein, a scraper member normally closing said slot, means extending to the interior of the casing for imparting rotary motion to said scraper to establish communication between the upper and lower compartments and to scrape the deposited filter cake from the upper surface of the partition and deposit the same in the lower compartment through said slot, a filter member disposed within the lower compartment and means for establishing communication between the exterior of the lower compartment and the interior of the last-named filter for withdrawing fluid from the lower compartment through said filter.

3. In a fluid pressure filter of the class described and employing a filter cake or powder, a container, a horizontally disposed partition dividing the container into upper and lower compartments, a plurality of concentrically disposed filter members disposed within the upper compartment, means disposed below the filters and having oppositely directed openings therein on opposed sides of the center of the container for imparting a swirling motion to the incoming fluid, a plurality of output pipes leading to the exterior of the container and having seats disposed within the compartment, the filters having inner and outer filtering surfaces and a piped connection for each filter communicating with the interior portion of the filter and having a seat adapted to seat in one of the seats on the output pipes, a baffle member disposed in the center of the upper compartment for directing the fluid against the filters, the horizontally disposed partition having a slot therein, a scraper member normally closing said slot, means extending to the exterior of the casing for imparting rotary motion to said scraper member to establish communication between the upper and lower compartments and to scrape the deposited filter cake from the upper surface of the partition and deposit the same in the lower compartment through said slot, a filter member disposed within the lower compartment, means for establishing communication between the exterior of the compartment and the interior of the last-named filter for withdrawing liquid from the lower compartment through said filter, the lower compartment having an opening in its sidewall, a cover removably secured to said opening, the last named filter being secured to said cover whereby upon removal of the cover the last-named filter may be removed from the lower compartment and access gained to the lower compartment for removing filter cake deposited therein.

4. In a pressure filter for removing impurities from liquid solvents and the like and adapted to use a filter powder which is deposited in cake form on the filter during the filtering operation, a casing having upper and lower compartments, a plurality of concentrically disposed filters in the upper compartment, each of said filters comprising a pair of spaced fine mesh screens adapted to stop the filter powder and to allow the solvent to pass therethrough, each of said filters having a vertically disposed pipe communicating with the space defined by the two fine mesh screens, each pipe being divided by a vertically extending partition and having openings communicating with the space between the screens, means for forcing the fluid to be cleaned into the lower portion of the upper compartment, means for withdrawing the fluid from the lower end of said pipes which communicate with the space defined by fine mesh screens, a baffle member substantially filling the central portion of the upper compartment for directing the fluid to be cleaned against the said screens, a partition separating the upper and lower compartments and having a slot therein, a scraper blade normally closing said slot and means for imparting movement to the scraper blade to open said slot and to scrape deposited cake of filter powder from the upper surface of said partition and deposit it in the lower compartment, the partition in said pipes in said filters permitting the foreign matter to be washed from the space defined by the fine mesh screens by injecting a fluid under pressure on one side of said partition in said pipes to force the fluid through the space defined by the fine mesh screens and back through the other side of the pipe.

5. In a pressure filter for removing impurities from dry cleaning solvents wherein a filter cake is employed in the filtering operation, a casing, a horizontally extending partition dividing the casing into upper and lower compartments, a radially disposed slot in said partition, a scraper member normally closing said slot, means for rotating the scraper member to remove deposited filter cake from the upper surface of said partition and to deposit the same through said slot into the lower compartment, a plurality of concentrically disposed filters disposed in spaced relation to each other in the upper compartment, each filter comprising a pair of spaced fine mesh screens, a supporting member disposed between the two screens, each filter having a pair of vertically disposed passageways adjacent each other, and having spaced openings establishing communication with the space between the fine mesh screens, means for forcing the solvent into the upper compartment below the lower ends of said filters, hollow members penetrating the casing, seats establishing communication between the space between the fine mesh screens and the hollow members, means for withdrawing the fluid outwardly through the hollow members, means for removably securing the filters in position, a cylindrical baffle member disposed concentrically of the filters and inside of the innermost filter, the adjacent passageways in said filters permitting foreign matter to be washed from between the fine mesh screens by injecting a liquid under pressure into one passageway to force it around the entire filter and out through the other passageway.

6. A filter apparatus for removing impurities from solvents in dry cleaning establishments comprising a casing, a plurality of concentrically disposed filters disposed within said casing, a baffle member disposed inside the smaller filter and concentrically of both filters, means for forcing the solvent into the casing below the lower edge of the filters, means for withdrawing the solvent from the interior of the filters, each of said filters having a pair of vertically disposed passageways adjacent each other integral with its side walls and communicating with the interior of the filters, whereby foreign matter can be removed from the interior of the filters by forcing the liquid under pressure into one passageway to cause the liquid to fill the filter and to return through said other passageway.

7. A filter apparatus for removing impurities from dry cleaning solvents comprising a casing, a horizontally disposed partition dividing the casing into upper and lower compartments, a plurality of concentric filters disposed in the upper compartment, means for forcing the solvent into the upper compartment below the lower edge of the filters, a baffle member disposed in vertical position around the center of the upper compartment, means for withdrawing the solvent from the interior of the filters and passing it outside of the casing, said partition having a slot therein, a scraper member normally closing said slot and means for imparting rotary motion to said scraper to open said slot and to deposit filter cake, which has accumulated on the partition, through said slot and into the lower compartment, a foraminous filter disposed in the lower compartment, a piped connection between the exterior of the casing and the interior of the last-named filter, whereby solvent can be withdrawn from the lower compartment through said last-named filter, and means for removing said last named filter from the lower compartment for cleaning the same and gaining access to the lower compartment for removing filter cake therefrom.

8. In a pressure filter employing a filter powper or cake, for removal of impurities from dry cleaning solvents and the like, a casing having a compartment in which a plurality of concentrically disposed cylindrical filters are arranged, a cylindrical baffle member disposed within the space defined by the innermost of said plurality of filters, means for forcing the solvent below the lower edges of said filters, means for creating a suction within the filters and withdrawing liquid from the compartment through the filters and to the exterior of the compartment, each of said filters comprising cylindrical outer and inner fine mesh screens, a support disposed between the fine mesh screens, each filter having a pair of vertically disposed passageways therein disposed adjacent each other and communicating with the space between the fine mesh screens and also communicating with the means for passing the liquid to the exterior of the compartment, the pair of passageways permitting foreign matter which may pass through said fine mesh screens to be removed from between the screens by removing them from the compartment and forcing the liquid into one passageway through the entire space between the fine mesh screens and out through the other passageway.

9. A cylindrical filter comprising inner and outer spaced screens, rigid annular members closing the ends of the screens, a member having a pair of adjacent passageways forming a part of the sidewalls of the filter and being slotted to establish communication with the space defined by the fine mesh screens, whereby foreign matter can be expelled from the space between the fine mesh screens by injecting a fluid into one passageway to fill the space between the screens and to force the fluid and foreign matter out through the other passageway.

10. A filtering apparatus comprising a filter chamber with a plurality of filter grid structures therein of cylindrical formation and having upright grid surfaces, means discharging fluid to be filtered into said chamber at a point below the filters, said means having oppositely directed openings for imparting a horizontal rotary swirling movement to the fluid and a baffle member for directing the fluid in its upward travel over the grid surfaces, means for withdrawing fluid from the interior of the filters and passing it to the outside of the chamber, means to support the grid structures in the filter chamber to afford a free space surrounding the plurality of cylindrical grids and free spaces above and below the cylindrical grids in direct and free communication with the surrounding and enclosed spaces, a sludge receiving chamber beneath the bottom of the filter chamber, said bottom having a discharge opening from the filter chamber into the sludge receiving chamber, and means normally closing the opening and being operable to open the opening and to scrape sludge from the bottom of the filter chamber and depositing it through said opening into the sludge receiving chamber.

11. A filtering apparatus comprising a filter chamber provided with a plurality of cylindrical and concentrically disposed grids having their lower edges spaced from the bottom of the chamber, piped means to discharge fluid to be filtered into said chamber from a level below the grid means and having oppositely directed openings for imparting a swirling movement to the fluid for upward flow of the fluid over the grid means, said fluid discharge level being spaced above the bottom of the filter chamber and to afford a settling space in the chamber to permit a deposit of the heavy solid matter precipitated from the fluid and from the grid means to accumulate in the settling space, a cylindrical baffle member disposed centrally of the filter chamber and being of approximately the same height as the concentric cylindrical filters, a sludge receiving chamber beneath the bottom of the filter chamber, said bottom having a slot opening from the filter chamber into the sludge chamber, a scraper means normally closing said slot, means operable from the exterior of the filter to move said closure and scraper means from over the slot to scrape sludge from said bottom and deposit it through said slot into the sludge receiving chamber, means for withdrawing the filtered fluid from the interior of said filtering grid means and returning it to the outside of the filter, said means comprising a pair of separated and adjacent passageways communicating with the interior of the filtering grid means, said pair of passageways permitting foreign matter to be washed from the interior of the filtering grid means by removing the filtering grid means from the filter and forcing a liquid into one of said passageways and out through the other of said passageways.

12. In a filter for solvents used in dry cleaning apparatus and employing a filter powder, a casing, a partition dividing the interior of the casing into upper and lower compartments, a filter disposed in the upper compartment, an opening in said partition, means normally closing the opening and being movable over the partition to scrape filter powder from the partition and into said opening to allow it to fall into the lower compartment, means for circulating the solvent through the filter in the upper compartment, a hollow filter member disposed in the lower compartment, means for withdrawing the solvent from the lower compartment through the last-named filter.

13. In a filter for solvents used in dry cleaning apparatus and employing a filter powder, a casing, a partition dividing the interior of the casing into upper and lower compartments, a filter disposed in the upper compartment, an opening in said partition, means normally closing the opening and being movable over the partition to scrape filter powder from the partition and into said opening to allow it to fall into the lower compartment, means for circulating the solvent through the filter in the upper compartment, means for withdrawing the solvent from the lower compartment through the last-named filter, an opening in the wall of the lower compartment, a plate for closing the opening, and means for securing the last-named filter to the said plate so that when the plate is removed from over the opening the filter will be also removed from the lower compartment.

14. In a pressure filter of the class described, for filtering fluids and employing a filter cake or powder, a container, a horizontally disposed partition dividing the container into upper and lower compartments, a plurality of concentrically disposed circular filter members disposed within the upper compartment, an input pipe disposed below the filters and having oppositely directed slots in its sides and being disposed on opposed sides of the center of the container for imparting swirling motion to the incoming fluid, a plurality of output conduits leading to the exterior of the container and having seats disposed within the upper compartment, each filter having inner and outer filtering surfaces and a member having a channel communicating with the interior portion of the filter and having seats adapted to seat in the seats on the ends of the output conduits, a cylindrical baffle member disposed in the center of the upper compartment for directing the fluid against the filters, the horizontally disposed partition having a slot therein, a scraper member normally closing said slot, means extending to the exterior of the casing for imparting rotary motion to said scraper to establish communication between the upper and lower compartments and to scrape the deposited filter cake from the upper surface of the partition and deposit the same in the lower compartment through said slot, and means for reversing the flow in the input and output pipes for washing deposited filter cake from the exterior surface of the inner and outer filtering surfaces.

15. In a pressure filter of the class described for filtering fluid and employing a filter cake of powder, a container, a horizontally disposed partition dividing the container into upper and lower compartments, a plurality of concentrically disposed filter members disposed within the upper compartment, an input pipe disposed below the filters and having oppositely directed slots therein on opposed sides of the center of the container for imparting a swirling motion to the incoming fluid, a plurality of output pipes leading to the exterior of the container and having seats disposed within the upper compartment, the filters having inner and outer filtering surfaces, a connection communicating with the interior portion of the filter and having seats adapted to seat in the seats on the ends of the output pipes, a baffle member disposed in the center of the upper compartment for directing the fluid against the filters, the horizontally disposed partition having a slot therein, a scraper member normally closing said slot, means extending to the exterior of the casing for imparting rotary motion to said scraper to establish communication between the upper and lower compartments and to scrape the deposited filter cake from the upper surface of the partition and deposit the same in the lower compartment through said slot, a filter member disposed within the lower compartment, means for establishing communication between the exterior of the lower compartment and the interior of the last-named filter for withdrawing fluid from the lower compartment through said filter, and means for reversing the flow in the input and output pipes for washing deposited filter cake from the exterior surface of the inner and outer filtering surfaces.

16. In a pressure filter for removing impurities from liquid solvents and the like and adapted to use a filter powder which is deposited in cake form on the filter during the filtering operation, a casing having upper and lower compartments, a plurality of concentrically disposed filters in the upper compartment, each of said filters comprising a pair of spaced fine mesh screens adapted to stop the filter powder and to allow the solvent to pass therethrough, each of said filters having a vertically disposed pipe communicating with the space defined by the two fine mesh screens, each pipe being divided by a vertically extending partition and having openings communicating with the space between the screens, means for forcing the fluid to be cleaned into the lower portion of the upper compartment, means for withdrawing the fluid from the lower end of said pipes which communicate with the space defined by fine mesh screens, a baffle member substantially filling the central portion of the upper compartment for directing the fluid to be cleaned against said screens, a partition separating the upper and lower compartments and having a slot therein, a scraper blade normally closing said slot and means for imparting movement to the scraper blade to open said slot and to scrape deposited cake of filter powder from the upper surface of said partition and deposit it in the lower compartment, the partition in said pipes in said filters permitting foreign matter to be washed from the space defined by the fine mesh screens by injecting a fluid under pressure on one side of said partition in said pipes to force the fluid through the space defined by the fine mesh screens and back through the other side of the pipe, and means for reversing the direction of flow of the fluid into and out of the upper compartment for removing the filter cake deposited on the exterior surface of the fine mesh screens.

17. In a pressure filter for removing impurities from dry cleaning solvents wherein a filter cake is employed in the filtering operation, a casing, a horizontally extending partition dividing the casing into upper and lower compartments, a radially disposed slot in said partition, a scraper member normally closing said slot, means for rotating the scraper member to remove deposited filter cake from the upper surface of said partition and to deposit the same through said slot into the lower compartment, a plurality of concentrically disposed filters disposed in spaced relation to each other in the upper compartment, each filter comprising a pair of spaced fine mesh screens, a supporting member disposed between the two screens, each filter having a pair of vertically disposed passageways adjacent each other, and having spaced openings establishing communication with the space between the fine mesh screens, means for forcing the solvent into the upper compartment below the lower ends of said filters, hollow members penetrating the casing, seats establishing communication between the space between the fine mesh screens and the hollow members, means for withdrawing the fluid outwardly through the hollow members, means for removably securing the filters in position, a cylindrical baffle member disposed concentrically of the filters and inside of the innermost filter, the adjacent passageways in said filters permitting foreign matter to be washed from between the fine mesh screens by injecting a liquid under pressure into one passageway to force it around the entire filter and out through the other passageway, and means for reversing the flow of the solvent through the filters for washing deposited filter cake from the exterior surfaces of the fine mesh screens.

18. In a filter apparatus for removing impurities from solvents in dry cleaning establishments comprising a casing, a plurality of concentrically disposed filters disposed within the said casing, a baffle member disposed inside the smaller filter and concentrically of both filters, means for forcing the solvent into the casing below the lower edge of the filters, means for withdrawing the solvent from the interior of the filters, each of said filters having a pair of vertically disposed passageways adjacent each other integral with its sidewalls and communicating with the interior of the filters, whereby foreign matter can be removed from the interior of the filters by forcing the liquid under pressure into one passageway to cause the liquid to fill the filter and to return through said other passageway, and means for reversing the flow of the solvents through the filters.

19. In a pressure filter for removing impurities from dry cleaning solvents and employing a filter powder or cake, a casing, a cylindrical filter grid disposed in said casing and having its longitudinal axis disposed in a vertical plane, said filter comprising spaced inner and outer filtering screens joined at their upper and lower ends, said filter grid having a vertically disposed portion provided with a passageway on each side thereof in communication with the exterior of the filter grid, each passageway having openings establishing communication between the passageways and the space between the filtering screens, means for forcing the solvent into the casing below the filter, means communicating with said passageways for withdrawing the solvent from the space between the filtering screens, means for reversing the direction of flow through said filtering screens to remove deposited filter cake from the exterior surfaces of the filtering screens, said adjacent passageways, when the filter grid is removed from the casing, permitting a liquid to be forced into one of the passageways and withdrawn from the other passageway to remove the foreign matter from the space between the walls of the filter grid.

20. A filter comprising spaced screens, means closing the space between the outer edges of the screens, a vertically disposed pipe filling the space between the screens where the pipe is located, said pipe having a vertically disposed partition providing a passageway on each side thereof, opposed sides of each passageway having a communication with the space between screens, and each passageway terminating in a common seat at one end of the screens whereby both passageways may serve to admit liquid into the space between the screens or to withdraw liquid from the space between the screens, said passageways also permitting liquid to be forced inwardly through one passageway and outwardly through the other passageway to remove foreign matter from the interior proximate surfaces of the screens and the space therebetween.

21. A filter comprising spaced screens, means closing the space between the outer edges of the screens, a longitudinally disposed partition member disposed between the screens and filling the space between the screens where the partition member is located, said partition member having a passageway on each side thereof, in communication with the space between the screens, whereby foreign matter can be expelled from the space between the screens by injecting a fluid into one passageway to fill the space between the screens and to force the fluid and foreign matter out through the other passageway.

BLAINE KELLEY.